(12) United States Patent
Babol et al.

(10) Patent No.: US 9,910,657 B2
(45) Date of Patent: Mar. 6, 2018

(54) INSTALLING SOFTWARE WHERE OPERATING SYSTEM PREREQUISITES ARE UNMET

(71) Applicant: INTERNATIONAL BUSINESS MACHINES CORPORATION, Armonk, NY (US)

(72) Inventors: Adam Babol, Crakow (PL); Stefan Gruszczynski, Crakow (PL); Pawel T. Januszek, Crakow (PL); Jacek Midura, Crakow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 14/855,601

(22) Filed: Sep. 16, 2015

(65) Prior Publication Data
US 2017/0075675 A1     Mar. 16, 2017

(51) Int. Cl.
*G06F 9/445*     (2006.01)
*G06F 9/455*     (2018.01)
*G06F 9/44*      (2018.01)

(52) U.S. Cl.
CPC ............ *G06F 8/64* (2013.01); *G06F 9/45545* (2013.01); *G06F 8/60* (2013.01); *G06F 8/61* (2013.01); *G06F 9/4406* (2013.01); *G06F 9/455* (2013.01); *G06F 9/4555* (2013.01); *G06F 2212/152* (2013.01)

(58) Field of Classification Search
CPC . G06F 8/60; G06F 8/61; G06F 9/4406; G06F 2212/152; G06F 9/455; G06F 9/4555
See application file for complete search history.

(56) References Cited

U.S. PATENT DOCUMENTS

| 7,849,460 B1 | 12/2010 | Martin et al. |
| 7,954,098 B1 | 5/2011 | Martin et al. |
| 8,725,839 B2 | 5/2014 | Madduri et al. |

(Continued)

OTHER PUBLICATIONS

Micah Sherr and Matt Blaze, Application Containers without Virtual Machines, ACM, 2009, retrieved online on Sep. 28, 2017, pp. 39-41. Retrieved from the Internet: <URL: http://delivery.acm.org/10.1145/1660000/1655155/p39-sherr.pdf?>.*

(Continued)

*Primary Examiner* — Hanh T Bui
(74) *Attorney, Agent, or Firm* — Richard Wilhelm, Esq.; Kevin P. Radigan, Esq.; Heslin, Rothenberg, Farley & Mesiti, P.C.

(57) ABSTRACT

A method for installing a computer program is provided, which includes: determining at a beginning of an installation procedure of the computer program whether an operating system being executed on the computer systems supports a prerequisite component for installing and executing the computer program by using operating system support information corresponding to the computer program. Based on determining that the prerequisite component is not supported by the operating system, performing: setting up a container comprising the prerequisite component using operating system level virtualization, installing the computer program in the container, and providing information on how to access the computer program being executed on the container.

18 Claims, 5 Drawing Sheets

(56) References Cited

U.S. PATENT DOCUMENTS

| | | | | |
|---|---|---|---|---|
| 8,938,735 | B2 | 1/2015 | Jimmerson | |
| 9,766,915 | B1* | 9/2017 | Emelyanov | G06F 8/63 |
| 2002/0091872 | A1 | 7/2002 | Bourke-Dunphy et al. | |
| 2011/0126192 | A1* | 5/2011 | Frost | G06F 8/61 |
| | | | | 717/178 |
| 2012/0011513 | A1* | 1/2012 | McConaughy | G06F 9/545 |
| | | | | 718/100 |
| 2013/0232498 | A1* | 9/2013 | Mangtani | G06F 9/5072 |
| | | | | 718/104 |
| 2014/0173589 | A1* | 6/2014 | Babol | G06F 8/61 |
| | | | | 717/174 |
| 2015/0150003 | A1* | 5/2015 | Emelyanov | G06F 9/455 |
| | | | | 718/1 |
| 2016/0098285 | A1* | 4/2016 | Davis | G06F 9/45545 |
| | | | | 718/1 |
| 2016/0261716 | A1* | 9/2016 | Khalaf | G06F 9/445 |
| 2016/0378525 | A1* | 12/2016 | Bjorkengren | G06F 9/45558 |
| | | | | 718/1 |
| 2016/0378564 | A1* | 12/2016 | Gaurav | G06F 9/45558 |
| | | | | 718/1 |

OTHER PUBLICATIONS

Sarath Pillai, Docker Tutorial: How to Install and Use Containers, Slashroot.in, Nov. 17, 2014, retrieved online on Sep. 28, 2017, pp. 1-15. Retrieved from the Internet: <URL: http://www.slashroot.in/docker-tutorial-how-install-and-use-containers>.*

Mongkolluksame et al., "A Management System for Software Package Distribution", 2012 Proceedings of PICMET '12: Technology for Emerging Technologies (2012) pp. 3529-3526.

* cited by examiner

INSTALLING SOFTWARE WHERE OPERATING SYSTEM PREREQUISITES ARE UNMET

BACKGROUND

Computing environments continue to grow in complexity on operating system level and on application level. Although service-orientation and object-orientation in software development and service provisioning grow in importance, software applications continue to require a predefined set of environment characteristics to be installed and run correctly. Most software installation procedures support a prerequisite checking before the software product installation. Once a prerequisite checking has been performed successfully, chances are high that a software product may run in a given operating system environment. When an operator starts an installation, a prerequisite checking is usually executed as a first step of the installation procedure. If this prerequisite checking fails, typically the operator may be informed about the missing prerequisite by displaying the missing prerequisite and the installation procedure may be stopped. Issues like not enough available disk space or missing libraries are usually easy to fix. The problem is more severe if an operator wants to install a software product on an unsupported operating system. Normally, the operator may have to install the correct operating system on another version of the same operating system either on the same computer or on a different computer. This may also involve finding another free computer, where the required operating system environment and the software product may be installed. A virtualization using a hypervisor may not always be the best option.

SUMMARY

According to one aspect of the present invention, a method for installing a computer program is provided, which includes: determining at a beginning of an installation procedure of the computer program whether an operating system being executed on the computer system supports a prerequisite component for installing and executing the computer program by using operating system support information corresponding to the computer program; and based on determining that the prerequisite component is not supported by the operating system, automatically performing the following: setting up a container comprising the prerequisite component using operating system level virtualization, installing the computer program in the container, and providing information on how to access the computer program to be executed in the container.

In another aspect, a system is provided for installing a computer program on a computer system. The system includes a memory, and a processor in communications with the memory. The system performs a method comprising: determining at a beginning of an installation procedure for the computer program whether an operating system being executed on the computer system supports a prerequisite component for installing and executing the computer program by using operating system support information corresponding to the computer program; and automatically performing the following based on the prerequisite component not being supported by the operating system: setting up a container comprising the prerequisite component using operating system level virtualization; installing the computer program in the container; and providing information on how to access the computer program being executed in the container.

In a further aspect, a computer program product is provided for installing a computer program on a computer system. The computer program product includes a computer readable storage medium having program instructions embodied therewith, the program instructions being executable on a computing device to cause the computing device to: determine at a beginning of an installation procedure of the computing program whether an operating system being executed on the computer system supports a prerequisite component for installing and executing the computer program by using operating system support information corresponding to the computer program; and based on determining that the prerequisite component is not supported by the operating system, perform the following: set up a containing comprising the prerequisite component using operating system level virtualization; install the computer program in the container; and provide information on how to access the computer program being executed in the container.

BRIEF DESCRIPTION OF THE SEVERAL VIEWS OF THE DRAWINGS

Embodiments of the invention are described below, by way of example only, with reference to the following drawings.

DETAILED DESCRIPTION

Figure 1:
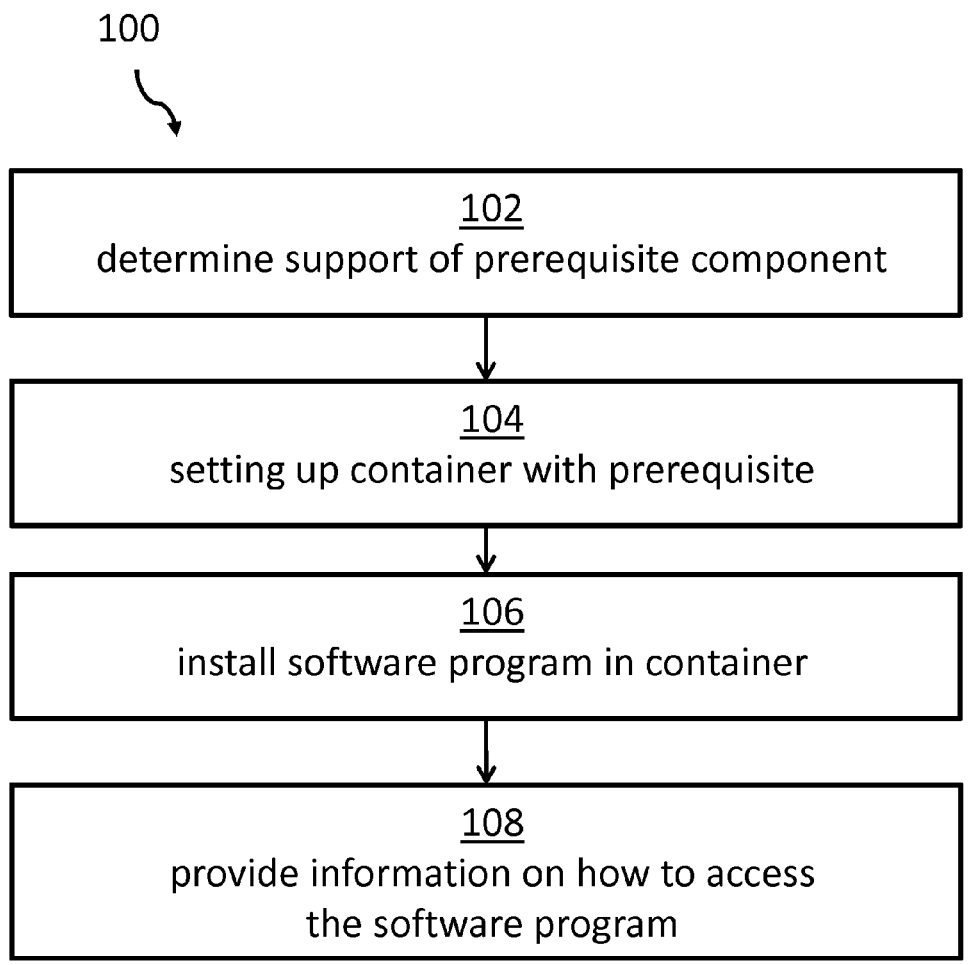
FIG. 1 shows a block diagram of one embodiment of a method for installing a computer program, in accordance with one or more aspects of the present invention.

Generally stated, the present invention provides, in one or more aspects, a method for installing a computer program which includes, for instance: determining at a beginning of an installation procedure of the computer program whether an operating system being executed on the computer system supports a prerequisite component for installing and executing the computer program by using operating system support information corresponding to the computer program; and based on determining that the prerequisite component is not supported by the operating system, automatically performing the following: setting up a container comprising the prerequisite component using operating system level virtualization; installing the computer program in the container; and providing information on how to access the computer program to be executed in the container.

According to one or more other aspects of the present invention, an installer module for installing a computer program on a computer system may be provided. The installer module may comprise a determination unit adapted for determining at a beginning of an installation procedure for the computer program whether an operating system being executed on the computer system supports a prerequisite component for installing and executing the computer program by using operating system support information corresponding to the computer program. The installer module may also comprise an installation unit adapted for automatically performing the following in case said prerequisite component is not supported on the operating system: setting up a container comprising the prerequisite component using operating system level virtualization, installing the computer program in the container; and providing information on how to access the computer program to be executed in the container.

Furthermore, one or more of the inventive embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

It may be noted that operating system level virtualization may not be intermixed with traditional virtualization techniques using a hypervisor.

Those skilled in the art will note that embodiments of the present invention are described herein with reference to different subject-matters. In particular, some embodiments are described with reference to method type claims whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention will be apparent from the exemplary embodiments described herein, which are provided as examples, and not by way of limitation.

In the context of this description, the following conventions, terms and/or expressions may be used:

The term 'computer program' may denote any executable program code which may be installed in an operating system environment. It may, e.g., be an application program with a user interface or, it may be any middleware program performing backend services in a product software context like, e.g., a database, a content management system, a communication program, and analysis server for large amounts of data, a speech recognition server or, any other generally installable program. In the context of this description, a computer program may also denote one component of a larger computer program context, e.g., only one implementable service.

The term 'computer system' may denote a computing device having installed an operating system thereon. The operating system may provide basic functionality to manage the underlying hardware. In the context of this description it may be assumed that the computer system may not be a virtualized system running on a hypervisor.

The term 'installation procedure' may denote an initial setup task to enable a software program to become executable in an operating system environment. This may require that certain functions may be available for the software program to be installed by the operating system. As an example, one may think of an email program as the software program which may require access to the Internet. If the operating system environment may not provide basic communication services for accessing a network, the pre-requisite component required to access the Internet may not be available. In this case, the installation procedure may inform an operator that a component—in particular in this example, a network communication component—may not be available and thus, the installation procedure may be terminated without installing the software program, in this case, the email program. On the other side, the email program may require access to an I/O system for interacting with a user.

The term 'operating system' may denote software that manages basic functions of computer hardware and software resources and may provide common services for computer programs. The operating system may be an essential component of the system software in a computer system. Application programs usually require an operating system to function. Examples of operating systems in the sense of this description may be the Linux operating system in its various distributions (e.g., Suse, Red Hat, Ubuntu, etc.), the Windows Operating System from Microsoft, iOS from Apple, another Unix derivate e.g., AIX, HP-UX, etc.), z/OS and so on.

The term 'a prerequisite component' may denote any software that may be required to run a given software program. That may be a special program service, a specific library, a set of metadata or a configuration file, or the like.

The term "operating system support information" may denote an information source related to the software program to be installed comprising the prerequisites required to install and successfully execute the software program. The prerequisite information may be included in a file associated to the software program. In other embodiments, a library may be provided comprising prerequisite information for a plurality of different software programs.

The term 'container' may denote a predefined software environment in which mal functions—e.g., fatal address errors—may not have a negative impact on other applications or the operating system. The term container is known to a skilled person in the context of operating system level virtualization.

The term "operating system level virtualization"—or also operating-system-level virtualization—may denote type of server virtualization technology which works at the operating system layer. The physical server and a single instance of the operating system may be virtualized into multiple isolated partitions, where each partition replicates a real server. The operating system kernel may run a single operating system and may provide the operating system functionality to each of the partitions. It may not be confused with an operating system virtualization or full virtualization of a hardware system which may require a hypervisor.

Operating system level virtualization may typically provide an additional layer of abstraction on the Linux operating system. One example for providing operating system level virtualization functions is the open source project named Docker. It may use resource isolation features of the Linux kernel such as so-called cgroups and kernel namespaces to allow independent "containers" to run within a single Linux instance, avoiding the overhead of starting and maintaining complete virtual machines.

The Linux kernel's support for namespaces mostly isolates an application's view of the operating environment including process trees, network, user IDs and mounted file systems, while the kernel's cgroups provide resource isolation including the CPU, memory, block I/O and network. Since recently, Docker includes the libcontainer library as its own way to directly use virtualization facilities provided by the Linux kernel in addition to using abstracted virtualization interfaces via libvirt, LXC (Linux Containers) and systemd-nspawn.

Thus, a container may not require a complete separate operating system. Instead, it relies on the kernel's functionality and uses resource isolation (CPU, memory, block I/O, network, etc.), and separate namespaces to isolate the application's view of the operating system for providing a lightweight virtualization technique.

By using containers, resources may be isolated, services restricted, and processes provisioned to have an almost completely private view of the operating system with their own process ID space, file system structure and network interfaces. Multiple containers may share the same kernel, but each container may be constrained to only use a defined amount of resources, such as CPU, memory and I/O.

The proposed method for installing a computer program may offer numerous advantages and technical effects, including those set out below.

Through the proposed techniques it may be ensured that a program may not be installed in an operating system environment which does not fit, i.e., may not provide all prerequisites required for a proper and error free execution of the software program to be installed. On the other side, it may not be required to generate additional workloads on a hardware system by a complete system virtualization using a hypervisor. The use of containers on a kernel operating system like Linux allows for a proper separation of user spaces and at the same time for operating system environments that may be different form software program to software program being executed using the same operating system kernel.

Using the inventive aspects disclosed herein, it may be determined automatically what the prerequisites for a software program are and whether it may be executed in the existing operating system environment. If that is not the case, a container may be set up fulfilling not all the prerequisites required for a proper execution of the software program. The container may comprise already all required components like software libraries, configuration parameters or other metadata. According to traditional technologies, ensuring that all prerequisites are met in order to execute a program or software process correctly may be a manual process for a system administrator. If hundreds of containers have to be set up for either many different users or software programs/software processes this may become an unmanageable task for a human being such that an automatic, machine-supported mechanism may be required in order to enable a quick set-up of software components running in an operating system level virtualization environment.—In case of missing components for a software program to be executed in a container, a manual search for missing components may be unfeasible for a system administrator and may—in addition—make the whole hardware/software combination instable. Thus, a risk of a crashing computer system may be avoided by the proposed method and system. The proposed method and system may be seen as a pre-caution against such mal-function of complete hardware/software systems.

In the following, a detailed description of the figures will be given. All instructions in the figures are schematic. Firstly, a block diagram of one embodiment of a method for installing a computer program is given. Afterwards, further details as well as embodiments of the installer module for installing a computer program are described.

FIG. 1 shows a block diagram of one embodiment of a method 100 for installing a computer program—in particular any given program, middleware, database, communication program, compiler, application program, and so on—on a computer system. The method may comprise determining, 102, at a beginning of an installation procedure of the computer program whether an operating system being executed on the computer system may support a prerequisite component—typically, more than one—for installing and executing the computer program by using operating system support information corresponding to the computer program.

In case of a positive determination—"yes"—the following may be performed: setting up, 104, a container comprising the prerequisite component using operating system level virtualization, installing, 106, the computer program in the container, and providing information, 108, on how to access the computer program to be executed in the container.

According to one or more embodiments of the method, the prerequisite component may comprise one or more of a software library, a configuration parameter, or a software module. These components may represent typical prerequisites for a software program to be installed. The method may ensure that one or more of these missing components may be available automatically for or within the container, then a container may comprise such prerequisite components already by definition.

According to an advantageous embodiment of the method, the setting up of the container may comprise receiving a confirmation signal for setting up the container. This function may ensure that for a software program to be installed, the container may not be generated and installed completely automatically. A user operator may optionally influence the decision whether to install the container. Although the container may represent only a lightweight additional workload to the operating system, the operator may decide to install the software program on another computer system having the operating system including all the required prerequisites or alternatively using a complete virtualized environment using a hypervisor. Alternatively, the decision may also be done by an automatic service according to a set of rules.

According to an optional embodiment of the method, the determination may be performed automatically by an installer module. The installer module may either be implemented by a software component of the operating system or it may be implemented in hardware or in a combination of software and hardware, potentially with microcode. This may enable a faster installation process.

According to another embodiment of the method, the installing the computer program in the container may comprise configuring the computer program. Thus, all installation parameters and configuration parameters required to execute the software program may be used for a proper set up of the environment for the computer program in the container instead directly on the operating system. Running in the container may require a different set of configuration parameters for the software program.

According to an optional embodiment of the method, the providing information on how to access the computer program may comprise providing a trigger signal to the operating system that the installing of the software program has been finished. This may comprise a "successfully installed" message or an "installation failed" message. The operator may then proceed accordingly.

According to an advantageous embodiment of the method, the container may be an operating system level virtualization container. Such a container may, for example, be implemented using technology from the open source project Docker and the Linux environment. However, also other operating system level virtualization methodologies and techniques may be used. This may have the advantage that only one operating system kernel may have to be installed on the computer system. Special features of different Linux distributions may be limited to different containers comprising these special features.

According to a further embodiment of the method, the container may be installed from an image copy of the container stored on a persistent memory like a hard drive. This may enable a quick installation and setup of the container without any further configuration requirements. The image may just be copied from a hard disk into RAM.

Figure 2:
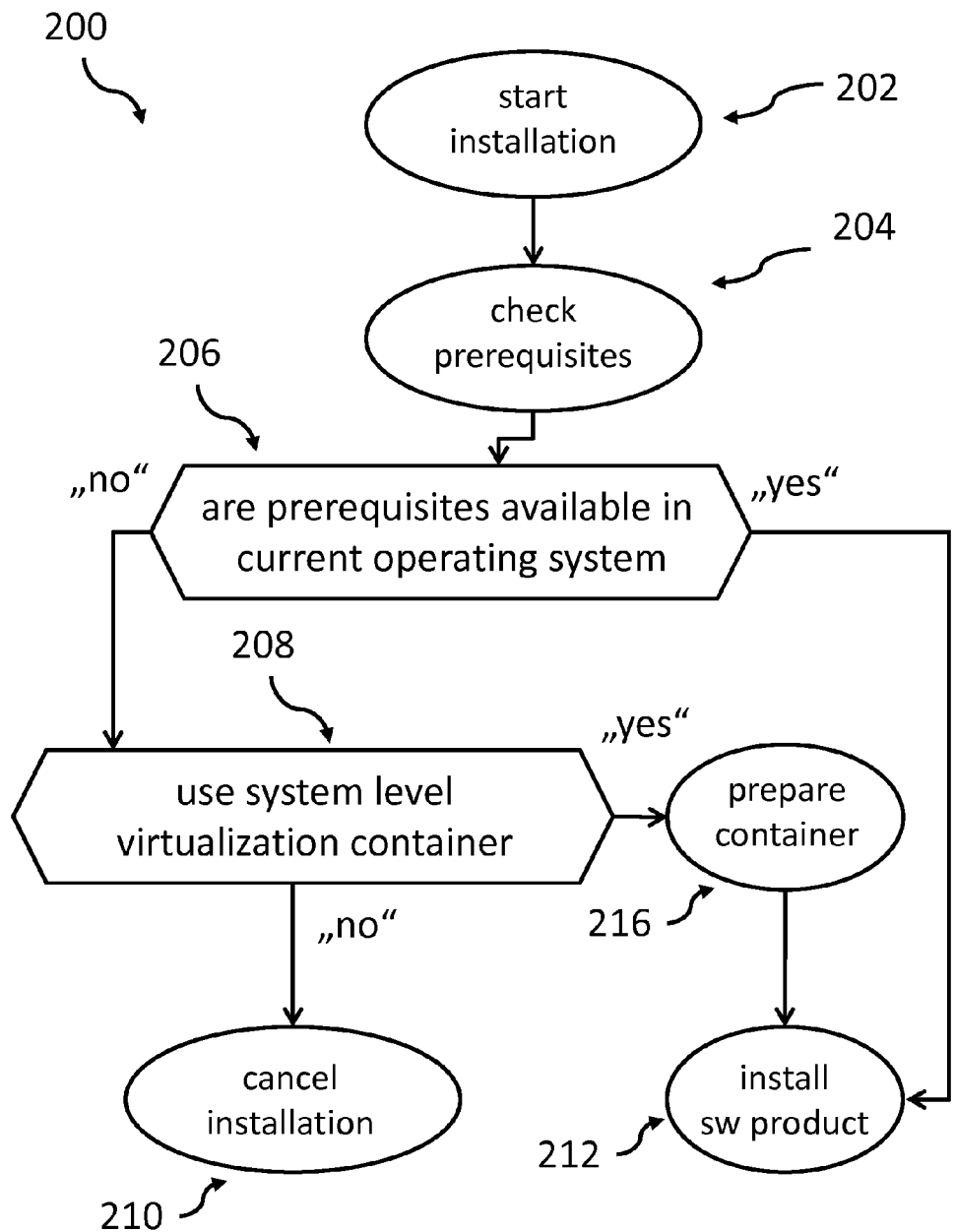
FIG. 2 shows a more detailed flowchart of one embodiment of a method for installing a computer program, in accordance with one or more aspects of the present invention.

FIG. 2 shows a flowchart 200 of one embodiment of the method in more detail. At a start of the installation, 202, prerequisites for a software program to be installed may be checked, 204. If it is determined that the prerequisites required for a software program to be installed are not available in the current operating system—compare 206 "no"—it may be determined whether an operating system level virtualization container should be used, 208. An operator may confirm this decision. In case of "no" the installation of the software product may be canceled, 210.

If it may be determined in 206 that the prerequisites for installing the software product are available in the current operating system—case of "yes"—the software product may be installed, 212, on the current operating system.

If it may be determined in 208 that the operating system level virtual container shall be used—case of "yes"—the container may be set up and prepared, 216, and the software product may be installed in the container, 212.

Figure 3:
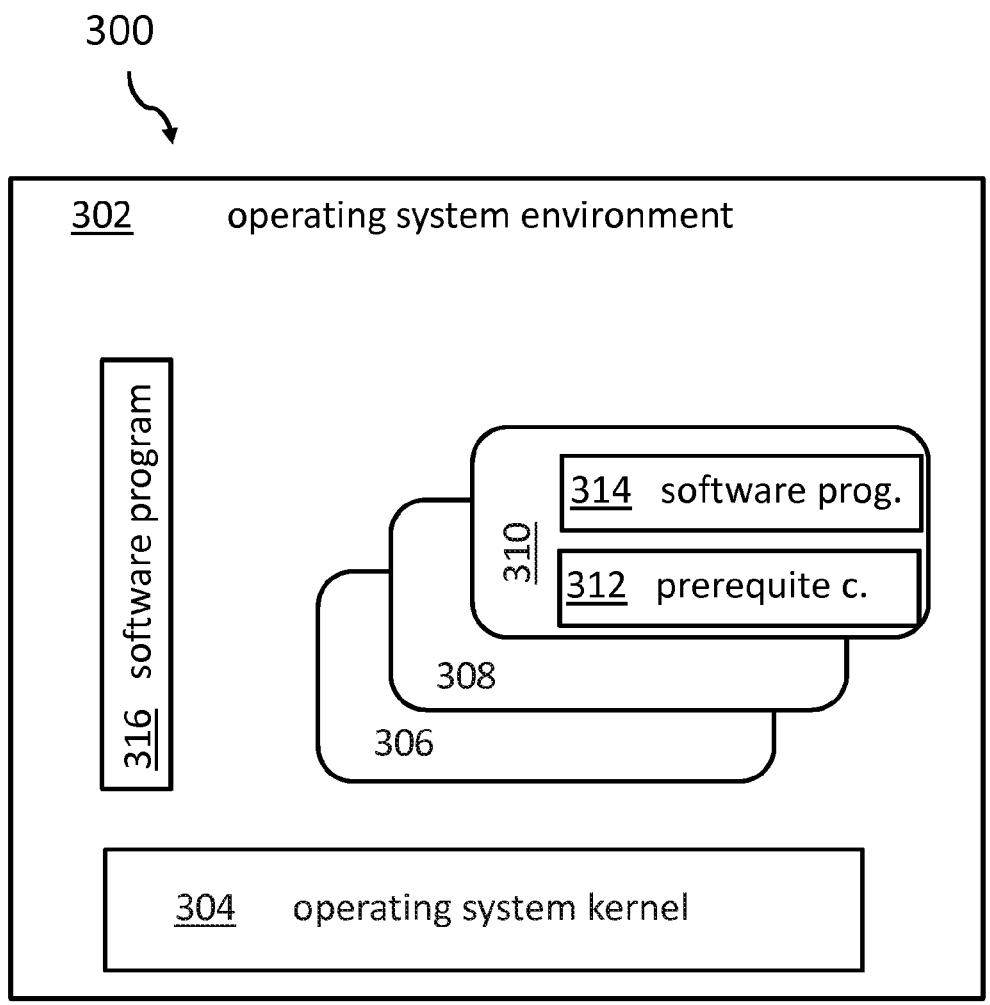
FIG. 3 shows a block diagram of one embodiment of an environment for a container, in accordance with one or more aspects of the present invention.

FIG. 3 shows a block diagram 300 of one embodiment of an environment for the containers. An operating system environment 302 may comprise an operating system kernel 304. In case all prerequisites may be fulfilled by the operating system environment 302, a software program 316 may be installed directly within the operating system environment 302 and may run directly on the operating system kernel 304 or associated operating system environment components.

Alternatively, if prerequisites for another software program 314 may not be met—one or more prerequisite components may not be available as part of the operating system environment 302—the one or more prerequisite components 312 may be installed together with or additionally to a container 310. Additionally, within this container the software program 314 may also be installed. Additionally, other containers 306 and 308 are shown which may also be set up in the operating system environment 302.

Figure 4:
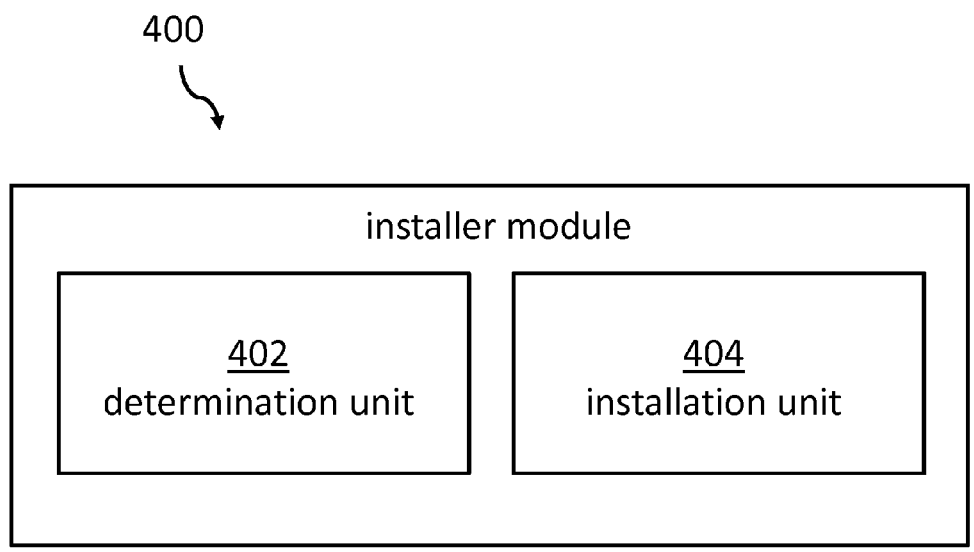
FIG. 4 shows one embodiment of an installer module for installing a computer program on a computer system, in accordance with one or more aspects of the present invention.

FIG. 4 shows one embodiment of an installer module 400 for installing a computer program on a computer system according to one or more aspects of the present invention. The installer module 400 may comprise a determination unit 402 which may be adapted for determining whether an operating system being executed on the computer system may support a prerequisite component for installing and executing the computer program. This may be performed at a beginning of an installation procedure. Operating system support information corresponding to the computer program may be used for this determination.

The installer module may also comprise an installation unit 404 adapted for a determination that the prerequisite component may not be supported by the operating system.

The installation unit 304 may be adapted for performing the following: setting up a container comprising the prerequisite component using operating system level virtualization, installing the computer program in the container, and providing information on how to access the computer program to be executed in the container.

Figure 5:
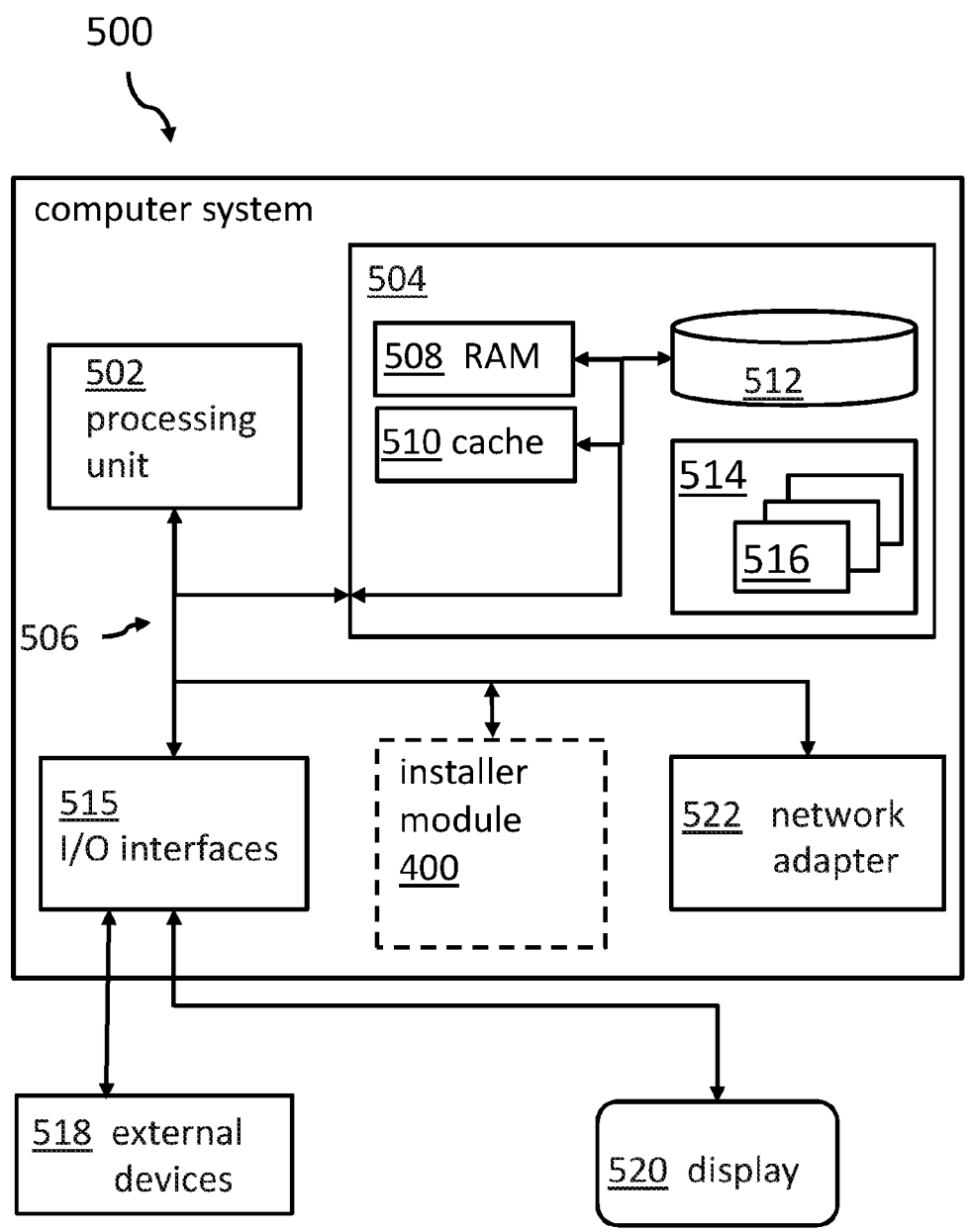
FIG. 5 shows one embodiment of a computing system comprising an installer module, in accordance with one or more aspects of the present invention.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 515. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the installer module 400 for installing a computer program may be connected with the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for installing a computer program on a computer system, the method comprising:
    determining at a beginning of an installation procedure of the computer program whether an operating system being executed on the computer system supports a prerequisite component for installing and executing the computer program by using operating system support information corresponding to the computer program; and
    based on determining that the prerequisite component is not supported by the operating system, and based on determining to install the computer program on a container, accessing an image of the container to be run at a kernel level of the operating system and performing:
        setting up, without involving a hypervisor, the container from the image, the container to run at the kernel level of the operating system being executed on the computer system, and the container comprising the prerequisite component using operating system level virtualization at the kernel level of the computer system, the container at the operating system kernel level of the computer system being different from, and consuming less computer system overhead than, a complete operating system virtualization using the hypervisor, the container being virtualized at the kernel level and relying on functionality of the operating system kernel of the computer system;
        installing the computer program in the container running at the kernel level of the operating system without using the hypervisor; and
        providing information on how to access the computer program to be executed in the container.

2. The method of claim 1, wherein the prerequisite component comprises at least one of a software library, a configuration parameter, or a software module.

3. The method of claim 1, wherein the setting up of the container comprises receiving a confirmation signal for setting up the container.

4. The method of claim 1, wherein the determining is performed by an installer module.

5. The method of claim 1, wherein the installing the computer program in the container comprises configuring the computer program.

6. The method of claim 1, wherein the providing information on how to access the computer program comprises providing a trigger signal to the operating system that the installing of the software program has been finished.

7. The method of claim 1, wherein at least one of the operating system or the prerequisite component comprises a Linux distribution or a part thereof.

8. The method of claim 1, wherein the container is installed from an image copy of the container.

9. The method of claim 1, further comprising:
based on determining that the prerequisite component is not supported by the operating system, initially determining whether to install the computer program on another computer system having the prerequisite component, on a complete operating system virtualization using the hypervisor, or on a container to run at a kernel level of the operating system being executed on the computer system, and based on determining to install the computer program on the container, proceeding with accessing the image of the container, and the performing the setting up, without involving the hypervisor, of the container from the image.

10. A system for installing a computer program on a computer system, the system comprising:
a memory; and
a processor in communications with the memory, wherein the system performs a method comprising:
determining at a beginning of an installation procedure for the computer program whether an operating system being executed on the computer system supports a prerequisite component for installing and executing the computer program by using operating system support information corresponding to the computer program; and
based on the prerequisite component not being supported on the operating system, and based on determining to install the computer program on a container, accessing an image of the container to be run at a kernel level of the operating system, and performing:
setting up, without involving a hypervisor, the container from the image, the container to run directly at the kernel level of the operating system being executed on the computer system, and the container comprising the prerequisite component using operating system level virtualization at the kernel level of the computer system, the container at the operating system kernel level of the computer system being different from, and consuming less computer system overhead than, a complete operating system virtualization using the hypervisor, the container being virtualized at the kernel level and relying on functionality of the operating system kernel of the computer system;
installing the computer program in the container running at the kernel level of the operating system; and
providing information on how to access the computer program to be executed in the container.

11. The system of claim 10, wherein the prerequisite component comprises at least one of a software library, a configuration parameter, or a software module.

12. The system of claim 10, wherein the setting up of the container comprises receiving a confirmation signal for setting up the container.

13. The system of claim 10, wherein the installing the computer program in the container comprises configuring the computer program.

14. The system of claim 10, wherein the providing information on how to access the computer program comprises providing a trigger signal to the operating system that the installing of the software program has been finished.

15. The system of claim 10, wherein at least one of the operating system or the prerequisite component comprises a Linux distribution or a part thereof.

16. The system of claim 10, wherein the container is installed from an image copy of the container.

17. A computer program product for installing a computer program on a computer system, the computer program product comprising a computer readable storage medium having program instructions embodied therewith, the program instructions being executable on a computing device to cause the computing device to:
determine at a beginning of an installation procedure of the computer program whether an operating system being executed on the computer system supports a prerequisite component for installing and executing the computer program by using operating system support information corresponding to the computer program; and
based on determining that the prerequisite component is not supported by the operating system, and based on determining to install the computer program on a container, access an image of the container to be run at a kernel level of the operating system, and perform:
setting up, without involving a hypervisor, the container from the image, the container to run at the kernel level of the operating system being executed on the computer system, and the container comprising the prerequisite component using operating system level virtualization at the kernel level of the computer system, the container at the operating system kernel level of the computer system being different from, and consuming less computer system overhead than, a complete operating system virtualization using the hypervisor, the container being virtualized at the kernel level and relying on functionality of the operating system kernel of the computer system;
installing the computer program in the container running at the kernel level of the operating system without using the hypervisor; and
providing information on how to access the computer program to be executed in the container.

18. The computer program product of claim 17, wherein the container is installed from an image copy of the container.

* * * * *